United States Patent [19]

Brunsch et al.

[11] 4,309,865
[45] Jan. 12, 1982

[54] METHOD AND APPARATUS FOR PRODUCING WINDINGS OF FIBER COMPOUND MATERIAL ON A CORE

[75] Inventors: Klaus Brunsch, Weidach bei Wolfratshausen; Rudolf Schindler, Ottobrunn; Bernd Bongers, Heimstetten; Ralf-Thilo Schulz, Ruhpolding, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 104,567

[22] Filed: Dec. 17, 1979

[30] Foreign Application Priority Data

Dec. 22, 1978 [DE] Fed. Rep. of Germany ....... 2855638

[51] Int. Cl.³ .................... D07B 7/14; D07B 3/06; D02G 3/36
[52] U.S. Cl. .............................................. 57/15; 57/7; 57/295
[58] Field of Search .................. 57/3, 6, 7, 13, 15, 57/295, 296, 297

[56] References Cited

U.S. PATENT DOCUMENTS

| | | | |
|---|---|---|---|
| 2,714,414 | 8/1955 | Ganahl et al. | 57/15 X |
| 2,723,705 | 11/1955 | Collins | 156/432 X |
| 2,760,549 | 8/1956 | Nash et al. | 156/432 X |
| 3,032,461 | 5/1962 | Baker et al. | 57/15 X |
| 3,068,134 | 12/1962 | Cilker et al. | 57/7 |
| 3,396,522 | 8/1968 | Bingini | 57/15 |
| 3,448,569 | 6/1969 | Brown et al. | 57/15 |
| 4,125,423 | 11/1978 | Goldsworthy | 156/432 X |
| 4,142,352 | 3/1979 | Greczin | 57/13 X |

FOREIGN PATENT DOCUMENTS 2114963 10/1972 Fed. Rep. of Germany.

Primary Examiner—Donald Watkins
Attorney, Agent, or Firm—W. G. Fasse; D. F. Gould

[57] ABSTRACT

Windings of fiber compound materials are produced on a core in multicourses whereby the fiber arrangement may change from course to course. For this purpose a plurality of fiber coil carriers are arranged in sequence one after the other as viewed in the direction of core advancement. The fiber coil carriers are arranged coaxially relative to the core. The coils of fibers are supported by the fiber coil carriers. The r.p.m. of each fiber coil carrier is adjustable independently of the r.p.m. of any other coil carrier. Each r.p.m. is adjusted to be inversely proportional to the desired pitch of the fibers in the respective winding course. The direction of rotation of each coil carrier is also selectable independently of the rotational direction of any other coil carrier.

16 Claims, 6 Drawing Figures

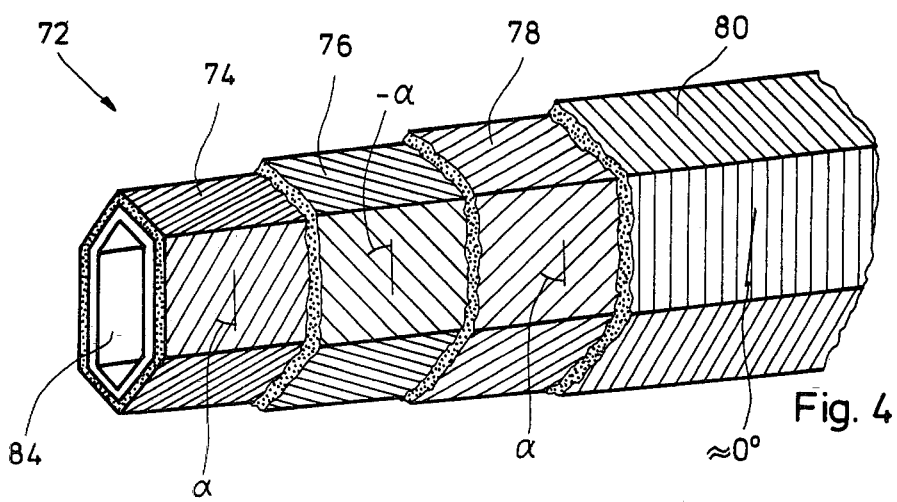
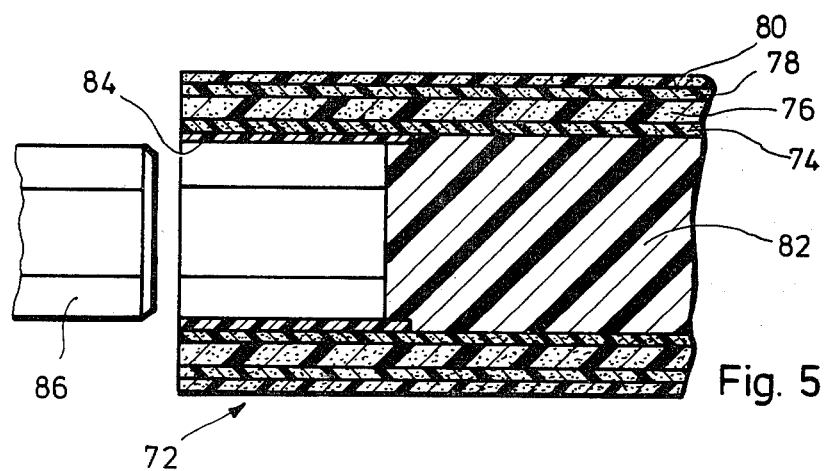
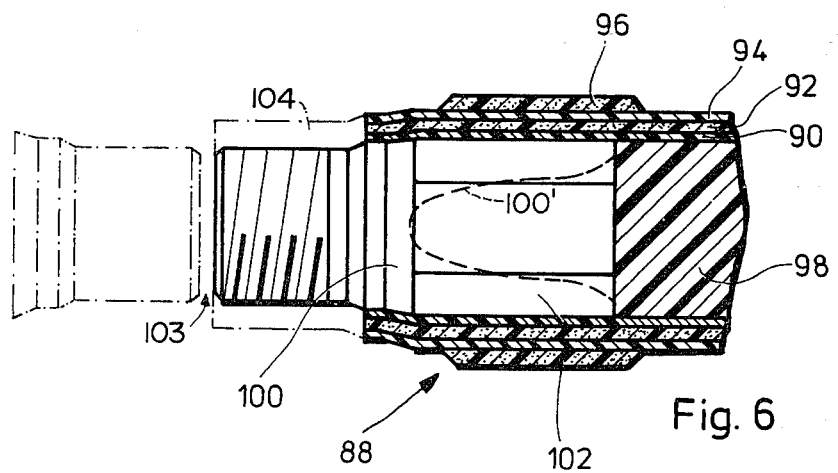

METHOD AND APPARATUS FOR PRODUCING WINDINGS OF FIBER COMPOUND MATERIAL ON A CORE

BACKGROUND OF THE INVENTION

The present invention relates to a method and apparatus for producing windings of fiber compound material on a core. More specifically, the invention relates to producing multi-layered windings of fiber compound material, whereby the fiber arrangement may change from fiber layer to fiber layer. In the present apparatus a plurality of fiber coil carriers are arranged in a row or column one behind the other and coaxially relative to the travel direction of the core on which the windings are being wound. The fiber coil carriers are driven as disclosed herein.

Prior art methods and devices for producing of longitudinal multi-layer, wound articles in a single work operation by means of a plurality of coil carriers arranged in a row and coaxially driven by sleeves. In such articles the individual winding layers have the same wall thickness. Further, in these articles the lead or pitch angles of the individual threads or strands are the same, but may extend in opposite directions for the threads or strands. This feature of prior art articles is accomplished in that neighboring coil carriers are driven in opposite directions but with the same r.p.m.

On the other hand, multi-layer, tubular winding bodies of fiber compound material in which the individual fiber layers have independently variable wall thicknesses and varying arrangements of the individual fiber layers, have been produced heretofore either by hand or, in a limited way also by machine. In the prior art machine production each fiber layer is produced in a separate work sequence by winding an endless thread onto an inner core until the desired wall thickness is achieved. Due to the anisotropic material characteristics of the fiber compound material, the pitch and the pitch or lay direction are usually predetermined from a material strength point of view due to the use of conventional, single speed coil winding machines. A substantial disadvantage of this production method is seen in that much time is required for producing a winding or winding body, whereby the total manufacturing costs are correspondingly high.

OBJECTS OF THE INVENTION

In view of the above it is the aim of the invention to achieve the following objects singly or in combination:

- to provide a winding method and a winding operation suitable for the rapid production of elongated, multi-layer windings or winding bodies of fiber compound material in which the wall thickness may be selected as desired from fiber layer to fiber layer;
- to provide a method and apparatus for making windings or winding bodies in which each winding layer has its individual pitch and wherein the pitch or lay direction of the reinforcing fibers is variable independently of the pitch and lay direction of the reinforcing fibers in any of the other fiber layers;
- to produce such windings or winding bodies in an economical manner;
- to produce multi-layer fiber reinforced windings or winding bodies having high strength and stiffness with different wall thicknesses and fiber orientations from winding layer to winding layer;
- to produce windings of the described kind with a high precision and in large numbers as well as economically thereby assuring a uniform fiber density in all fiber layers;
- to use an inner core which may be a lost core used only once or which may be a reusable core which generally does not form a force transmitting, supporting function in the finished winding or winding body;
- to produce windings of the described type which may have any desired cross sectional configuration, for example, cyclindrical or polygonal, whereby the cross sectional configuration may vary along the length of the winding or winding body to produce, for example, conical or polygonal and conical winding bodies;
- to use preimpregnated fibers or to impregnate the fibers just prior to their being wound onto the winding or winding body;
- to use different kinds of reinforcing fibers for the various layers of a winding or to use mixed fibers for the individual fiber layers to thereby adapt the load bearing capabilities to the individual needs; and
- to provide for a continuous variability of the pitch of the individual reinforcing fibers.

SUMMARY OF THE INVENTION

According to the invention there is provided a method for producing, longitudinal, especially tubular windings or winding bodies made of fiber compound material and including several fiber layers, whereby the fiber arrangement changes from fiber layer to fiber layer. This construction is accomplished in that the winding bodies are wound onto an inner core by means of a plurality of fiber coil carriers which are arranged coaxially relative to the inner core and in a row or column along the core. Each coil carrier produces one fiber layer or winding course and the rotational speed of any individual fiber coil carrier is varied independently of the rotational speed of any of the other fiber coil carriers. However, the circumferential speeds are correlated to each other so that they are inversely proportional to the desired pitch of the fibers in the corresponding fiber layer or course.

In the apparatus according to the invention the individual fiber coil carriers are provided with rotational speed adjustment means which are individually adjustable in their rotational speeds independently of the rotational speed of any of the other speed adjustment means.

The method and apparatus according to the invention have the advantage that a plurality of fiber compound material windings or winding bodies may be manufactured continuously and in any desired length, whereby all fiber layers or courses are produced substantially simultaneously by a mechanized winding operation applying the synthetic material impregnated reinforcing fibers during a single passage of the inner core through the apparatus. It is a special feature of the invention that each individual fiber layer may be varied in its wall thickness as well as in its pitch direction and particularly also in its pitch itself. The spirally wound reinforcing fibers are individually controlled as they are being wound by a special, independently variable r.p.m. selection for each fiber coil carrier and by selectively placing the fiber coils on the respective coil carrier.

BRIEF FIGURE DESCRIPTION

In order that the invention may be clearly understood, it will now be described, by way of example, with reference to the accompanying drawings, wherein:

FIG. 4 is an illustration similar to that of FIG. 3 showing a winding or winding body with a polygonal cross-section and further showing a gliding sleeve integrally connected with one end of the winding body and also having a polygonal cross-section;

FIG. 5 is a schematic longitudinal partial section through a winding body of the type shown in FIG. 4; and FIG. 6 is a sectional view similar to that of FIG. 5 but showing a metallic connecting element operatively connected to one end of the winding body.

DETAILED DESCRIPTION OF PREFERRED EXAMPLE EMBODIMENTS AND OF THE BEST MODE OF THE INVENTION

The term winding or winding body as used herein comprises a plurality of winding layers or courses. A winding course may include a single or a plurality of winding layers.

Figure 1:
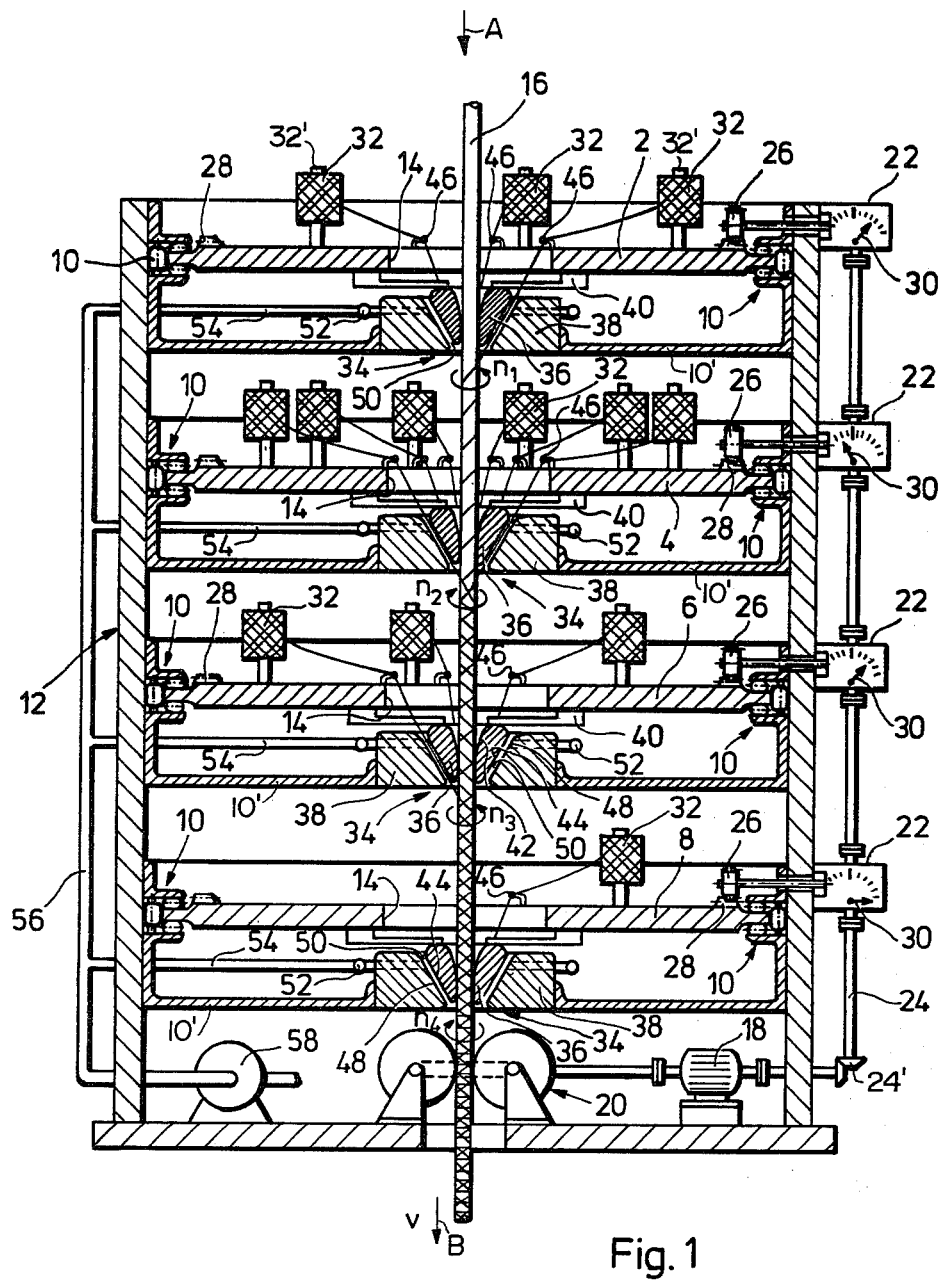
FIG. 1 is a longitudinal sectional view through a winding apparatus according to the invention, whereby the sectional plane extends in the rotational axis of the fiber coil carriers.
Figure 2:
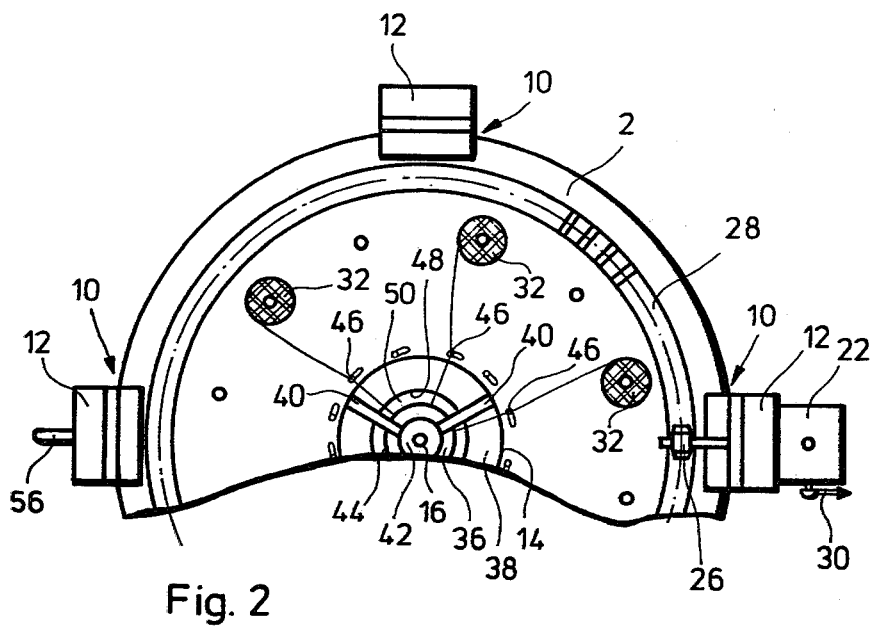
FIG. 2 is a partial top plan view in the direction of the arrow A in FIG. 1.

The winding apparatus according to the invention shown in FIGS. 1 and 2 comprises four circular fiber coil supports or carriers 2, 4, 6, and 8 arranged one above the other in a column or in a row if the longitudinal axis should extend horizontally. Each coil carrier is supported for rotation at its circumference by roller bearings 10 held in a frame member 10', whereby each carrier is rotatable independently of any other carrier about a central longitudinal axis represented by the inner core 16 which travels coaxially to the rotational axis of the apparatus. Each frame member 10' is operatively held in the machine frame 12.

Each coil carrier 2, 4, 6, 8 has a central opening 14 through which the central, inner core 16 moves. The core is prefabricated and supplied by a source not shown. The core 16 to which the windings are to be applied travels downwardly through the apparatus in the direction of the arrow B at the velocity "v". The feed advance of the core 16 is accomplished by roller means 20 driven by a motor 18.

The motor 18 rotates during the winding operation with a constant r.p.m. and serves simultaneously for driving the coil carriers 2, 4, 6, 8 with an r.p.m. which may be individually selected for each carrier. The rotational direction is also individually selectable. For this purpose a continuously adjustable, and in its rotational output reversible, gear drive 22 is operatively interposed between each coil carrier and the drive motor 18. A drive shaft 24 and respective gear means 24' connect the motor 18 to the gear drives 22 arranged in series. Each gear drive 22 is connected with its output through a pinion gear 26 to the ring gear 28 operatively secured to each coil carrier. The desired r.p.m. and the desired direction of rotation for the individual coil carriers 2, 4, 6, 8 is adjustable by means of a hand lever 30 forming part of each individual gear drive 22.

Each coil carrier 2, 4, 6, 8 carries a number of thread coils 32 rotatable on respective studs 32'. The number of coils 32 may vary from carrier to carrier as will be described in more detail below. A thread or fiber guiding and impregnating device 34 is operatively arranged below each carrier. Each guide and impregnating device 34 comprises a centrally arranged, ring shaped mouthpiece 36 and a form member 38. The mouthpiece 36 rotates with the carrier since it is connected to the carrier through respective arms 40 which hold the mouthpiece 36 coaxially relative to the rotational axis of the coil carriers. Each mouthpiece 36 comprises a central bore 42 performing a funnel and guiding function for the inner core 16, the diameter of which increases from carrier to carrier so that the respective bores 42 also increase in their diameter. Each bore 42 also contributes to rounding-off the core 16. Additionally, each mouthpiece 36 has an outer, conical, upwardly rounded guide surface 44 for the reinforcing threads or yarns coming from the individual yarn or fiber coils 32 guided by thread eyes 46. The thread eyes 46 and the guide surface 44 are so arranged that the individual threads are guided onto the inner core 16 at the proper winding point. If desired, brake means (not shown) may be arranged for individually applying a brake force to the fibers coming from the coils 32.

Each guide member 38 also referred to as a form-piece is operatively connected to the respective carrier 2, 4, 6, 8 and through the carrier to the machine frame 12. The form or guide member 38 also comprises a guide or counter surface 48 arranged for cooperation with the guide surface 44 of the mouthpiece 36. The counter surface 48 also has a frustum shape which opens upwardly to form together with the guide surface 44 a thread guide slot 50. The angle enclosed by the conical surface 44 and the angle enclosed by the conical surface 48 differ slightly from each other in such a manner that the thread guiding gap or slot 50 tapers downwardly thus, the thread guiding gap 50 tapers in the direction of the thread movement toward a smallest gap width corresponding approximately to the thickness of the reinforcing thread or yarn.

As the threads coming from the coils 32 pass through the thread guide gap 50 they are impregnated with synthetic material supplied to the gap 50 through respective holes in the form-piece 38. The holes are shown in dashed lines in FIG. 1 and the holes are connected to a ring conduit 52 which in turn is connected to supply conduits 54, 56 for the synthetic impregnating material. All the branching conduits 54 are connected to a common supply conduit 56 which in turn is connected to a synthetic material supply pump 58. Each ring conduit 54 is connected to the holes in the form member 38 for a uniform supply of synthetic material into the gap 50. The arrangement is such that excess synthetic material is stripped off the reinforcing fibers as they move through the lower end of the guide gap 50. Similarly, excessive synthetic material is stripped off the inner core 16 as it moves through the pulling through bores 42 after a fiber layer has been wound on the inner core 16 when it passed through the respective coil carrier. As mentioned above, the pulling through bores 42 will have increasing diameters corresponding to the increasing diameter of the windings as they are successively applied to the inner core 16.

Figure 3:
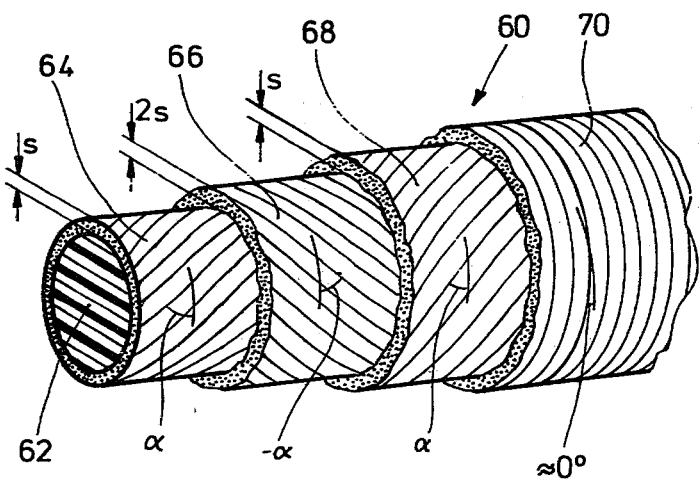
FIG. 3 illustrates a tubular, multi-layer or multi-course winding or winding body made of fiber compound material and having a circular cross-section, whereby, for a clearer illustration the internal structure of the individual fiber layers or courses is broken away in steps.

During the operation, the inner core or strand 16 is continuously advanced with a constant feed advance speed "v" through the winding apparatus, whereby one fiber layer is applied to the core or to the preceding layer at each coil carrier 2, 4, 6, 8. Each fiber layer comprises helically wound reinforcing threads pulled off the coils 32. The rotational direction of the individual coil carriers 2, 4, 6, 8 is adjusted prior to the winding operation by means of the hand levers 30 in accordance with the desired pitch direction of the reinforcing fibers. Thus, for example, for a right-hand pitch for the fibers in the first fiber layer, the coil carrier 2 rotates in the direction of the arrow $n_1$. Similarly, the second coil carrier 4 is selected to rotate in the opposite direction for a left-hand pitch of the fibers in the second fiber layer or course. In the third fiber layer the pitch direction may again be the same as in the first fiber layer so that the coil carrier 6 has the same direction of rotation as the coil carrier 2. The r.p.m. numbers $n_1$, $n_2$, $n_3$, $n_4$ of the individual coil carriers are also adjusted prior to beginning the winding operation, whereby again the hand lever 30 is used for such adjustment in accordance with the desired pitch or pitch angle of the reinforcing threads or fibers. The r.p.m.s are selected so that the respective coil carrier is driven with an r.p.m. which is inversely proportional to the pitch of the reinforcing fibers in the fiber layer produced by the respective coil carrier. For example, if the pitch angle of the first, innermost fiber layer is supposed to be 45° if the core diameter is 1.75 cm and the pitch is 5.5 cm, the r.p.m. of the coil carrier 2 is adjusted to provide a feed advance speed "v" equal to 1.1 m per minute corresponding to an r.p.m. $n_1 = 20$. If the fiber pitch of the layer produced by the coil carrier 4, that is in the second fiber layer is supposed to be only half as large as in the first fiber layer, the r.p.m. of the coil carrier 4 must be adjusted to a value twice as large as the r.p.m. of the first coil carrier. Thus, in the given example, the r.p.m. of the second coil carrier 4 would be 40. In an extreme example it is possibe to achieve with a very high coil carrier r.p.m. a pitch or rather a pitch angle which is substantially zero as shown in FIG. 3 for the winding 70 produced by the lowermost coil carrier 8 shown in FIG. 1 and rotating with an r.p.m. $n_4$.

The number of fiber or yarn coils 32 is selected in accordance with the r.p.m. "n" of each coil carrier and in accordance with the thickness of the fiber layer produced by the respective coil carrier. This number of coils is then placed on the respective studs 32' as shown in FIG. 1. In order to achieve a uniform density resulting in a substantially uninterrupted winding in all fiber layers, the number of coils 32 is changed from coil carrier to coil carrier in a ratio inverse to the respective r.p.m.s. Stated differently, the higher the selected r.p.m. of a coil carrier the smaller will be the number of coils 32 on the respective carrier. Additionally, it is possible to control the wall thickness of the individual fiber or winding courses, that is, the number of winding layers present in a winding or fiber, whereby the winding layers lie one above the other as viewed in the radial direction of the inner core 16. Such control is accomplished by a respective placing of coils on the coil carrier so that the number of coils ascertained in the manner described above as a function of the r.p.m. of the coil carrier for a single layer fiber course, is increased by the number of winding layers. Thus, turns will be wound on the inner core 16 at the respective mouthpiece 36, whereby the plurality of individual threads will not only be layed tightly one next to the other, but also one above the other so that all turns in the same course will have the same pitch as well as the same lay direction in each helical turn.

In the winding apparatus illustrated in FIGS. 1 and 2, the number of coils on the individual coil carriers satisfies the ratio of 3:6:3:1, whereby the fiber course produced by the coil carrier 4 will have a wall thickness twice as large as the wall thickness of the winding courses produced by the coil carriers 2 and 6 provided that the coil carriers 2, 4, and 6 rotate with the same r.p.m. in opposite directions.

By using different types of fibers or yarns on the payout coils 32 it is possible to apply such different fiber materials in successive layers. For examle, glass fibers may be carried by the coils on the coil carriers 2 and 6 while carbon fibers are carried by the coils on the coil carriers 4 and 8. Thus, it is possible to produce multilayer winding bodies suitable to be exposed to extremely high load conditions.

The inner core 16 is preferably, but not necessarily, a core of the so-called lost type which may be severed from a hollow tubular member of polyvinylchloride or it may be severed from a full section rod of a foam material as shown in FIGS. 3, 5, and 6. The hollow core is supplied to the winding apparatus as a so-called endless strand which is severed after the winding and curing operation to provide winding bodies of the desired length.

FIG. 3 shows a winding body 16 having a foam material inner core 62 of circular cross-section and four fiber courses 64, 66, 68, and 70. The innermost fiber course 64 and the third fiber course 68 have substantially the same wall thickness "s". Further, these winding courses 64 and 68 have the same direction of lay and fiber orientation, namely, with a left handed lay and a pitch angle $\alpha$. The second fiber layer 66 has a wall thickness twice that of the first and third course, namely, "2s" and a right-handed fiber orientation with a pitch angle of $-\alpha$. The outermost fiber course or winding course 70 is substantially a circumferentially extending winding for the purpose of preventing a bursting of the inner fiber courses 64, 66 and 68 under load conditions. Thus, the outer winding course 70 has a pitch angle which is substantially zero and a rather small wall thickness, thus, the outer course 70 comprises only one or, at best, a few fiber layers one above the other. Accordingly the outer course is produced by means of a coil carrier which rotates relatively rapidly as compared to the r.p.m. of any of the other coil carriers.

For example, glass fibers may be used to produce all fiber courses, whereby for further reinforcements between the inner core 62 and the first fiber course 64 a thin single layer carbon fiber course may be interposed. Similarly, between the fiber course 68 and the fiber course 70 a further, thin carbon fiber course may be arranged. These fiber courses are not shown for the sake of simplifying the illustration. However, the reinforcing carbon fibers would run substantially in parallel to the longitudinal axis of the winding body. Stated differently, the pitch angle of the carbon fibers would be 90° and these carbon fibers would be applied to the winding body as it is being produced on an apparatus as shown in FIGS. 1 and 2. For this purpose the apparatus would be provided with additional coil carriers. One such additional coil carrier would be arranged above the coil carrier 2 and another would be arranged between the coil carrier 6 and 8. These additional coil carrier would also be provided with corresponding guide and impregnating devices 34 as described. However, the coils on these additional coil carriers would be coils of carbon threads and these additional coil carriers would be stationary during the winding operation.

The winding body 72 shown in FIGS. 4 and 5 corresponds in the construction of its fiber courses 74, 76, 78, and 80 substantially to the embodiment shown in FIG. 3. However, the winding body 72 in FIGS. 4 and 5 has an inner core 82 of a polygonal cross-section and accordingly, all the winding courses also have a polygonal cross-section. In the shown example the cross-section is hexagonal. FIGS. 4 and 5 further illustrate the possibility of inserting into the foam material inner core 82 prefabricated elements prior to the winding operation. These inert elements are then also covered with the fiber windings as they pass through the winding apparatus whereby the insert elements become an integral, force transmitting component of the finished winding body. The inner core 82 of the winding body 72 is provided along its length with sleeves or bushings 84 made of polytetrafluoroethylene and also having a polygonal cross-section of the same geometry as the inner core. The sleeves or bushings 84 are spaced from one another by spacings which are determined by the length of the finished winding body. Thus, the inner core comprises sections of foam material and sections of sleeves or bushings 84 forming an endless strand which is moved continuously through the winding apparatus for a continuous winding of the fiber layers 74, 76, 78, and 80. The finished winding body of strands is then severed after the curing in the area of the bushing sections 84 so that the bushings are thus located at least at one end of the winding body as shown in FIG. 4. Thus, the bushings 84 with their, for example, hexagonal cross-section may serve as a coupling member. For example, a hexagonal shaft may be inserted into the respective bushing in a sliding and displaceable manner, however in a force locking manner relative to torque applied to the hexagonal shaft 86 or to the winding body. Preferably, the sleeves or bushings 84 have initially a length twice as long as is required for each individual sleeve, whereby upon severing the sleeves intermediate its ends will result in providing a bushing in the facing ends of two adjacent winding bodies.

FIG. 6 shows a winding body 88 also having a hexagonal cross-section. Thus, the embodiment of FIG. 6 with its fiber courses 90, 92, 94, and 96 and with its foam material core 98 is similar to the embodiments of FIGS. 4 and 5. However, the connecting element 100 in FIG. 6 is a threaded stud having a hexagonal shaft end 102 integrally connected into the end of the winding body 88. The connecting elements 100 are preformed as mirror-symmetrical double elements as shown by dash-dotted lines in FIG. 6. The double connecting elements have a recess 100' in the hexagonal portion also shown in dash-dotted lines in FIG. 6. A respective protruding part of the foam material core 98 fits into the recess 100' for operatively securing the connecting elements to the core 98, for example by a suitable adhesive, prior to the winding operation. Thus, the core 98 is formed as an endless strand comprising, in alternating succession, foam material sections 98 and double stud connecting elements 100. The winding courses are then applied to this endless strand in a continuous winding operation. After the curing or hardening of the winding body, it is severed in the plane 103 to form a plurality of winding bodies each having a connecting element 100 at each end. The winding portion 104 shown by dash-dotted lines in FIG. 6 on the threaded stud end is then removed, for example by cutting.

It is a special feature of the invention that at any time during the winding operation it is possible to individually and locally control the formation of the windings. Thus, local increases or decreases in the wall thickness of any winding course may be produced by controlling the speed of the respective coil carrier. The windings may be applied only in certain spots or areas of the inner coil or on a preceding course by intermittently driving the respective coil carrier. Thus, in FIG. 6 the outermost fiber layer or course 96 of the winding body 88 forms a circumferential winding with a pitch angle of about 0° extending only over the length of the hexagonal end 102 of the connecting element 100, since the winding body 88 requires exactly in this critical force introduction zone a special, ring shaped reinforcement which is provided by the fiber course 96 which surround the fiber course 94 substantially in the zone of the connecting element 100. Preferably, the fiber course 96 overlaps the zone where the connecting element 100 rests against the core 98 as shown in FIG. 6. The course 96 is formed, for example, by normally not rotating the coil carrier 8 during the winding operation, except for short time durations when the portion of the winding body, or of the core, which is to receive the course 96 passes through the coil carrier 8. During this time duration the respective coil carrier, e.g. 8, is rotated with a corresponding high r.p.m. For this purpose a separating clutch, not shown, is inserted between the drive pinion 26 and the gear drive 22 of the coil carrier 8. The separating clutch may be operated manually or automatically when the hexagonal end 102 of the core passes through the coil carrier 8 or rather through the outlet zone of the mouthpiece 36 of the coil carrier.

In the light of the foregoing disclosure it will be appreciated that a uniform fiber density is achieved in all fiber courses regardless whether a fiber course has a uniform wall thickness or when the individual fiber courses have different wall thicknesses. In the instance where all fiber courses have a uniform wall thickness the number of coils on each coil carrier is inversely proportional to the rotational speed of the respective carrier. Additionally, if the fiber courses have different wall thicknesses, that is, where at least several fiber courses comprise a plurality of winding layers having the same pitch and lay direction, the number of coils is increased in accordance with the number of fiber layers to be produced.

With regard to the core 16 it will be appreciated that it is a premanufactured product provided with the connecting or carrier elements such as shown in FIGS. 5 and 6. These connecting elements may be made of metal and are introduced into the inner core 16 prior to the winding operation at positions determined by the particular purposes for which the winding bodies are intended. In any event, the connecting or holding support elements form, after the winding operation and curing are completed, an integral component of the finished winding body, whereby a subsequent, time consuming mounting of separately produced connecting or insert elements is avoided.

Incidentally, in those instances where the cross section of the winding body is not cylindrical, the passage 42 through the mouthpiece 36 will be sufficiently large in diameter to permit the free movement of the core and of the winding body as it is being produced and as shown in FIG. 1.

Rather than using the impregnating means 52, 54, 56, 58 as described above, it is also possible to use so-called preimpregnated fibers also known as "prepregs". However, for most purposes it would be preferred to impregnate the fibers just immediately prior to their entering into the winding as described above with reference to the supply of the preimpregnating synthetic material directly into the gap 50 through which the fibers move.

Yet another advantage of the invention is seen in that the combination of various kinds of fibers is very simple by installing respective coils 32 of different fibers on any one of the coil carriers 2, 4, 6, 8. Thus, for example, carbon fibers and glass fibers may be used in advantageous combinations for substantially increasing the load capacity of the winding body.

With the aid of the gear drive 22 it is possible to individually vary the rotational speed of the coil carrier to thereby change the pitch of the reinforcing fibers in each individual winding layer or winding course within certain or predetermined limits. Each coil carrier is equipped with its own r.p.m. converter or gear drive 22. Yet another advantage is seen in that each mouthpiece 36 actually performs two functions simultaneously. On the one hand the inner bore or passage 42 properly guides the core 16 or winding body while the outer surface 44 guides the threads or fibers to the winding point. Actually, the outer surface 44 performs yet another function in that it cooperates with the form member 38 in the formation of the gap 50 for the supply of the impregnating material.

Although the invention has been described with reference to specific example embodiments, it will be appreciated, that it is intended, to cover all modifications and equivalents within the scope of the appended claims.

Each gear drive 22 comprises a driving element with a DC-Servomotor, triggered from a microprocessor, and a torque converter, coupled with fixed transmission ratio, fabricated by Servotron GmbH, Haidgraben 3, D-8012 Ottobrunn, a German company, model SM/SD 4000/4100.

What is claimed is:

1. A method for producing winding bodies of fiber compound material on a core in a winding operation, comprising the following steps: rotatably supporting a plurality of fiber coil carrier means in a column or row, advancing a core for said winding bodies substantially coaxially through all of said fiber coil carrier means, producing respective winding courses on said core by rotating each of said fiber coil carrier means independently of any other fiber coil carrier means, controlling the rotational speed of each fiber coil carrier means independently of the rotational speed of any other fiber coil carrier means, in such a manner that the speed of any fiber coil carrier means is inversely proportional to the pitch of the fiber turns in the respective winding course whereby the arrangement of the fibers varies from winding course to winding course in each winding body, and arranging on each fiber coil carrier means a predetermined number of fiber coils which number is inversely proportional to the rotational speed of the respective coil carrier means, whereby a plurality of windings each having a single layer winding course, are formed on said core.

2. A method for producing winding bodies of fiber compound material on a core in a winding operation, comprising the following steps: rotatably supporting a plurality of fiber coil carrier means in a column or row, advancing a core for said winding bodies substantially coaxially through all of said fiber coil carrier means, producing respective winding courses on said core by rotating each of said fiber coil carrier means independently of any other fiber coil carrier means, controlling the rotational speed of each fiber coil carrier means independently of the rotational speed of any other fiber coil carrier means, in such a manner that the speed of any fiber coil carrier means is inversely proportional to the pitch of the fiber turns in the respective winding course whereby the arrangement of the fibers varies from winding course to winding course in each winding body, and arranging on each fiber coil carrier means a predetermined number of groups of fiber coils whereby the number of groups of fiber coils corresponds to the number of winding layers in each winding course, and wherein the number of fiber coils in each group is inversely proportional to the rotational speed of the respective coil carrier means, whereby a plurality of winding courses each having a plurality of winding layers are formed on said core.

3. The method of claim 1 or 2, further comprising securing to said core, prior to the winding operation, a prefabricated connecting element, and then performing said winding operation whereby said prefabricated connecting element becomes an integral component of the respective finished winding body.

4. The method of claim 3, wherein said prefabricated connecting element is an insert formed to have a polygonal cross-section.

5. The method of claim 1 or 2 further comprising preimpregnating or presoaking the reinforcing fibers in a synthetic material prior to the winding operation proper.

6. The method of claim 5, wherein said preimpregnating or presoaking is performed on the reinforcing fibers between the respective fiber coil and said core.

7. The method of claim 1 or 2, further comprising winding on said coils fibers of different materials so that adjacent winding courses in a winding body comprise fibers of different fiber materials.

8. An apparatus for producing winding bodies of fiber compound material on a core, comprising a plurality of fiber coil carrier means (2, 4, 6, 8), support means (10, 12) for rotatably supporting said fiber coil carrier means in a row or column, core feed advance means (20) arranged for moving said core through said fiber coil carrier means, drive means (18, 24, 26) operatively connected to said fiber coil carrier means, adjustable r.p.m. control means (22) operatively interposed in said drive means for adjusting the r.p.m. of any one of said fiber coil carrier means independently of the r.p.m. of any other fiber coil carrier means, central guide means (36) provided individually for each fiber coil carrier means, said guide means comprising a central guide opening for said core, and outer guide surface means for guiding said fibers from the respective coil onto said core, impregnating or soaking means operatively arranged for cooperation with said guide surface means for soaking or impregnating said fibers on their way from the respective coil onto the core, wherein each of said impregnating or soaking means comprises a ring member operatively arranged to surround the respective central guide means to form a fiber guide slot between the ring member and the outer guide surface of said central guide member, and supply conduit means operatively connected to said ring member for supplying a synthetic impregnating or soaking material into said fiber guide slot.

9. The apparatus of claim 8, wherein said adjustable r.p.m. control means comprise separate gear means for each fiber coil carrier means, each gear means being reversible in its direction of rotation and continuously adjustable in its r.p.m.

10. The apparatus of claim 8, wherein said ring member is supported by said support means in a stationary position, and wherein said central guide means are supported by the respective fiber coil carrier means for rotation with the fiber coil carrier means relative to the respective ring member.

11. The method of claim 3, wherein said prefabricated connecting element is used in the form of a slide sleeve (84) adapted for slidably receiving a shaft end (86) for transmitting torque (FIG. 5).

12. The method of claim 3, wherein said prefabricated connecting element is used in the form of a stud having an outwardly extending threaded end (FIG. 6).

13. The method of claim 11, wherein said connecting element is prefabricated as a double element which is then severed along a central plane to form two separate connecting elements.

14. The method of claim 11, further comprising applying a reinforcement winding course (96) in the force introduction zone where said connecting element is located.

15. The method of claim 12, wherein said connecting element is prefabricated as a double element which is then severed along a central plane to form two separate connecting elements.

16. The method of claim 12, further comprising applying a reinforcement winding course (96) in the force introduction zone where said connecting element is located.

* * * * *